United States Patent [19]
Hummel et al.

[11] 3,954,432
[45] May 4, 1976

[54] METHOD FOR IMPROVING THE QUALITY OF FLAT GLASS FORMED ON A BATH OF MOLTEN TIN

[75] Inventors: Merritt J. Hummel, Lower Burrell; Thomas J. Nier, Cheswick, both of Pa.

[73] Assignee: PPG Industries, Inc., Pittsburgh, Pa.

[22] Filed: Oct. 15, 1974

[21] Appl. No.: 514,988

[52] U.S. Cl. .................................. 65/27; 65/65 A; 65/99 A
[51] Int. Cl.² .......................................... C03B 18/02
[58] Field of Search .............. 65/65 A, 99 A, 182 R, 65/27, 134

[56] References Cited
UNITED STATES PATENTS

| | | |
|---|---|---|
| 3,330,635 | 7/1967 | Loukes et al. .......................... 65/27 |
| 3,607,179 | 9/1971 | Loukes et al. .......................... 65/134 |

*Primary Examiner*—Arthur D. Kellogg
*Attorney, Agent, or Firm*—Dennis G. Millman; William J. Uhl

[57] ABSTRACT

A method for forming flat glass of high optical quality on a bath of molten tin, in which the glass has a relatively short residence time, is disclosed. The method involves adding an oxidizing agent to the hotter regions of the molten tin bath which is believed to modify the bottom or tin-contacting surface of the glass while the glass is on the bath of molten tin so as to be able to produce glass substantially free of top surface distortion, a problem which is particularly severe for glass having relatively short residence times on molten tin.

11 Claims, 3 Drawing Figures

METHOD FOR IMPROVING THE QUALITY OF FLAT GLASS FORMED ON A BATH OF MOLTEN TIN

BACKGROUND OF THE INVENTION

Field of the Invention

This invention relates to the manufacture of flat glass by forming on a bath of molten tin. More particularly, this invention relates to a method of minimizing top surface distortion associated with flat glass produced by forming on a bath of molten tin in which the glass has a relatively short residence time on the molten tin.

Brief Description of the Prior Art

Manufacturing of flat glass by forming on a bath of molten tin has been known since the 1900's and has been described in U.S. Pat. Nos. 710,357 to Heal, 789,911 to Hitchcock, and in U.S. Pat. Nos. 2,991,159; 3,083,551 and 3,220,816, all to Pilkington. Briefly, the process involves delivering a molten glass to a pool of molten tin confined within a forming chamber. Shortly after the initial delivery, the applied tractive forces in withdrawing the glass from the forming chamber attenuate the glass while it is cooling to form a continuous sheet of a ribbon of glass of a desired, predetermined, final shape and thickness which is continuously advanced over the bath of molten tin. To successfully form flat glass on a pool of molten tin, the forming chamber should be maintained as free as possible from oxygen because as the oxygen content of the tin rises, the glass absorbs increasing amounts of stannous tin particularly at the beginning of the forming chamber where the molten glass is discharged onto the molten tin. Subsequent heat treatment such as is used in a bending operation to make curved windshields or in thermal tempering brings about oxidation of the stannous tin to stannic tin resulting in distortion in the bottom or tin-contacting surface of the glass. This distortion is a microscopic wrinkling of the surface which scatters transmitted light and is familiarly referred to in the art as bloom. See FIG. 2 which is a photomicrograph of a bloomed glass surface.

Besides bloom which is on the bottom surface, another optical distortion associated with flat glass formed on a pool of molten tin is top surface distortion familiarly referred to as batter and broken line distortion. This distortion is much grosser than bottom surface bloom and is evidenced not as much by reduction in transmitted light, but is detected when the glass is observed at a small angle by reflected light. Top surface distortion known as batter is shown in the photograph in FIG. 1. Top surface batter seems to develop in the glass early in the forming operation in the hotter regions of the forming chamber when the glass is being attenuated into sheet form before it has attained its final shape and thickness.

Top surface distortion is worse in situations in which the glass has relatively short residence times on the molten tin. Such situations occur, for example, where the length of the forming chamber is relatively short, that is, where the length is less than about six times its width. Conventional forming chambers have length-to-width ratios of about 12 to 16:1. U.S. Pat. Application Ser. No. 483,508, filed June 27, 1974, to Kunkle discloses forming processes in relatively short forming chambers. Also, short residence time situations occur in forming chambers of conventional length (i.e, about 160 feet) for the production of relatively thin glass in which the continuously formed sheet of glass is advanced through the forming chamber at relatively high rates. In both cases, that is, in forming in shorter chambers and in forming thinner glass at relatively high rates in conventionally sized chambers, the residence time of the glass on the tin is relatively short and during this short period of time attenuating forces and cooling rates are quite high which is believed to aggravate top surface distortion.

Until the discoveries of the present invention, the prior workers in the art of glassmaking have not believed that the problems of bottom and top surface distortion were interrelated. The prior art believed that the problems had different origins and had to be dealt with separately. For example, since the origin of bottom surface bloom is stannous tin penetration of the bottom surface of the ribbon, the prior art has recommended various procedures to reduce the oxygen content of the tin bath since it is oxygen which oxidizes the tin metal to stannous tin. Thus, it has been proposed to tightly seal the float forming chamber and to conduct the float forming operation under a reducing atmosphere, for example, 95 percent nitrogen and 5 percent hydrogen gases.

With top surface distortion, the prior art quite reasonably believed that the origin of the problem resided in the top surface of the ribbon. Certain float glass manufacturers in the prior art believed that top surface distortion was due to volatilization of one or more of the volatile constituents of the glass composition from the surface of the glass. This volatilization, which created compositional differences between the ribbon surface and the interior portions of the ribbon, resulted in surface distortion due to different coefficients of thermal expansion between the ribbon surface and the interior as the glass is attenuated and cooled advancing through the tin bath. To control the problem, certain float glass manufacturers recommended altering basic float glass compositions so as to reduce their volatility.

SUMMARY OF THE INVENTION

Applicants believe that top surface distortion in float glass is due to a great extent on the cause of bottom surface bloom, that is, on the penetration of stannous tin into the bottom surface of the glass. The glass itself contains various oxides and dissolved oxygen which are believed to oxidize the absorbed stannous tin to stannic tin as the ribbon advances along the float bath. This internal oxidation is believed to occur as the glass is being attenuated and cooled. Applicants believe that this oxidation which occurs in the bottom surface stresses the top surface creating top surface distortion. As has been mentioned above, since the rates of attenuation and cooling are greater where the residence time of the glass on the bath are shorter, top surface distortion is a particularly acute problem in the forming of flat glass on shorter baths or forming thinner glass at high rates of speed in more conventionally sized forming chambers. Surprisingly, applicants have found that if an oxidizing agent is added to the molten tin in the hotter regions of the forming chamber where the glass is very fluid, top surface batter can be substantially eliminated. It is believed that the oxidizing agent modifies the bottom or tin-contacting surface of the glass which in turn has a surprising effect on maintaining the top surface substantially free of top surface distortion.

Therefore, in accordance with the present invention, an improved method for forming flat glass wherein molten glass is continuously delivered onto a pool of molten tin and supported thereon and wherein the glass is advanced along the surface of the molten tin and while being so advanced is cooled and subjected to attenuating forces to cause a dimensionally stable, continuous sheet of glass to be formed is provided. The improvement comprises:

a. rapidly cooling said glass while it is advancing along the surface of the molten tin such that the viscosity of the glass from its point of delivery increases at an average rate of at least 450,000 poises per minute until the glass has attained a viscosity of approximately $10^{6.0}$ poises, b. adding to the pool or bath of molten tin at a location wherein the glass supported thereon has attained a viscosity of $10^{5.3}$ poises or less an oxidizing agent which is capable of oxidizing stannous tin to stannic tin in an environment of molten glass, said oxidizing agent being added to the pool of molten tin in an amount sufficient to maintain said glass substantially free of top surface distortion.

DETAILED DESCRIPTION

Figure 1:
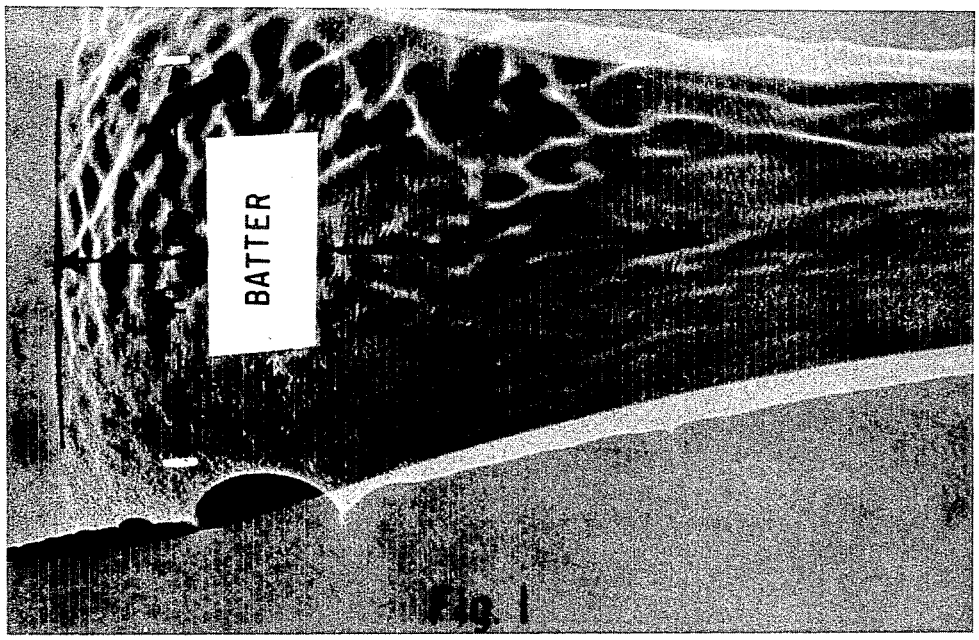
FIG. 1 is a photograph of a projected image (shadowgraph) resulting from projecting a point-light source through a 1/8 inch thick glass sample free of bottom surface bloom and having top surface batter.
Figure 2:
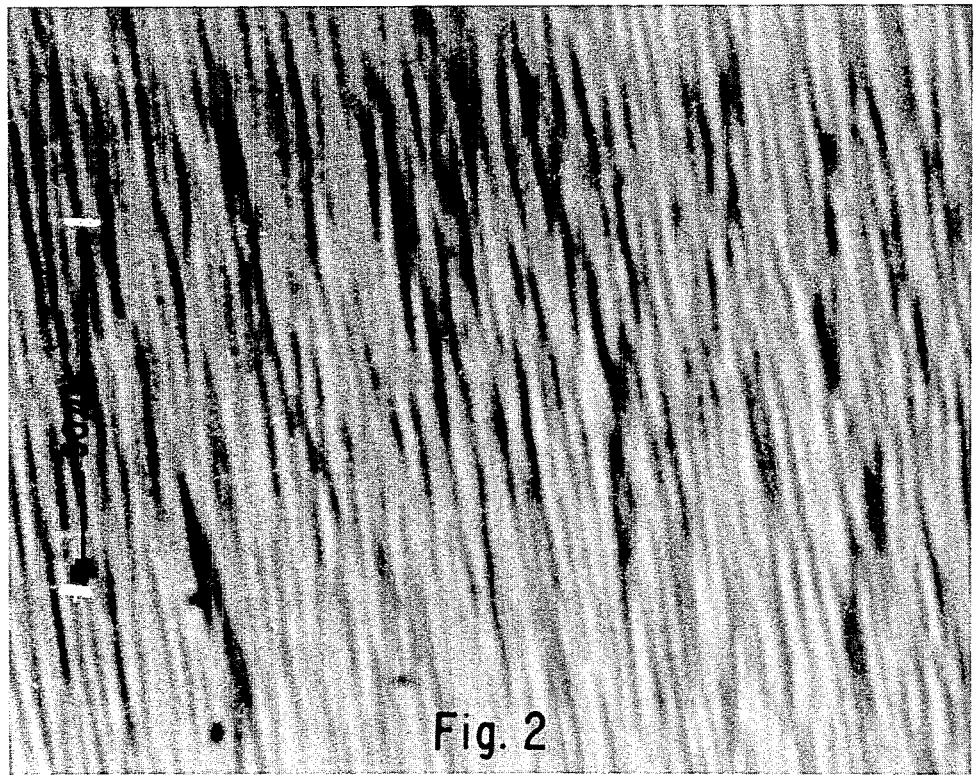
FIG. 2 is a photomicrograph 500X, showing distortion in float glass which occurs on the bottom or tin-contacting surface of the glass and which is known as bloom.
Figure 3:
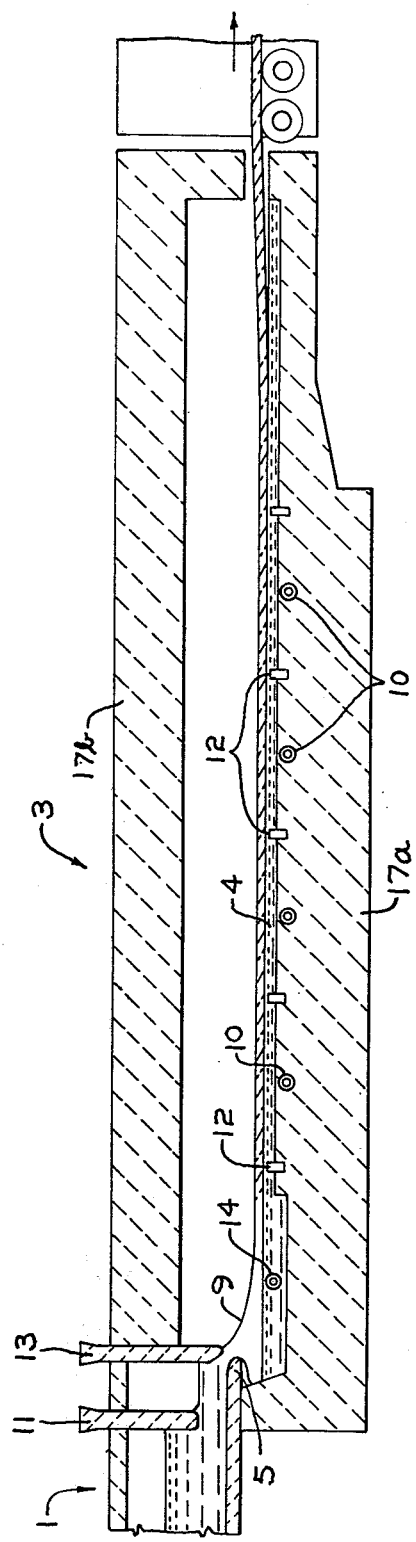
FIG. 3 is a longitudinal sectional view of a float glass forming chamber.

With particular reference to FIG. 3, there is shown a downstream end of a canal 1 leading into a float forming chamber 3 containing molten metal 4. The canal has a floor or lip 5 which, with side jambs, forms a spout of generally rectangular cross-section at the end of the canal. The molten metal is a tin or a tin alloy and has a greater density than the glass 9 discharged thereon and is substantially immiscible with the glass. A glass flow regulating tweel 11 and gate 13 are each adjustably suspended in a conventional manner and cooperate with the spout to control the flow of glass from the canal to the molten tin 4. Glass discharging from the spout freely spreads over the surface of the molten tin to form a fluid pool of glass. The applied tractive forces in withdrawing the glass from the chamber attenuate the glass in thickness and width while it is cooling to form a continuous sheet or ribbon.

The above-described method of delivery of molten glass to the molten tin is the method generally described in Pilkington, U.S. Pat. No. 3,083,551. However, it should be appreciated that other methods of delivery can be used. For example, the molten glass can be delivered to the pool of molten tin as a layer of molten glass in the manner generally described in U.S. Patent Application Ser. No. 338,497 to Edge et al, now U.S. Pat. No. 3,843,346 and U.S. Pat. No. 2,991,159 to Pilkington. In the Edge et al method, the layer of molten glass is delivered to the pool of molten tin in a substantially horizontal manner from a region of molten glass which is at substantially the same elevation as that of the molten tin. In the method of U.S. Pat. No. 2,991,159, the molten glass is delivered downwardly from a region of molten glass which is at a higher elevation than the molten tin. With these latter methods of delivery, the glass is attenuated substantially only in thickness as the width remains relatively constant throughout the forming operation.

The molten tin 4 is confined within the forming chamber 3 by refractory side walls and a bottom and top wall 17a and 17b, all constructed of a suitable refractory material which is essentially non-reactive with the tin.

A reducing atmosphere is imposed over the glass. Suitable reducing atmosphere is a mixture of 95 percent nitrogen and 5 percent hydrogen gases.

The float forming chamber shown in the drawing represents a relatively short chamber by float forming standards having an overall length of only about 80 feet as compared to conventional float forming chambers which have overall lengths of about 160 feet. In such a chamber, the glass has a relatively short residence time on the molten tin and the glass must be cooled quickly to form a dimensionally stable sheet so that the glass can be removed from the chamber without marring the surfaces of the sheet. To effect efficient heat removal, heat exchange pipes 10 and graphite dams 12 are positioned in and along the bottom wall of the forming chamber to cool and to partition the molten tin. Molten tin is an excellent thermal conductor and by partitioning and cooling as is shown in the drawings, a more efficient thermal gradient can be established in the forming chamber.

In the forming operation, the molten glass is delivered to the molten tin at a temperature at least above the liquidus temperature of the glass; the liquidus temperature being defined as the temperature devitrification first appears. At temperatures even slightly below the liquidus, devitrification occurs at a relatively rapid rate. For a procedure for determining the liquidus temperature, see J. Soc. Glass Techn., 24, 101–108 (1940) by E. Preston. Preferably, the glass is delivered to molten tin at a viscosity less than $10^{4.0}$ poises. At higher viscosities, the glass will not have sufficient fluidity for delivery and forming. With conventional soda-lime-silica glass compositions, the viscosity of the glass for delivery to the forming chamber as described in U.S. Pat. No. 3,083,551 to Pilkington is about $10^{3.5}$ poises. The viscosity of the glass at any point in the chamber can be determined by measuring its temperature and calculating the viscosity using Fulcher's Equation.

After the glass is delivered to the molten tin in the forming chamber, the glass is advanced along the surface of the molten tin and cooled to form a dimensionally stable ribbon. The rates of cooling are relatively high for those situations in which the glass has a relatively short residence time on the molten tin. Thus, the use of heat exchange pipes 10 and dams 12 such as are shown in FIG. 3. As the glass cools, its viscosity increases and it has been found that the greater the average rate of viscosity increase between the time the glass is delivered to the molten tin and the time the glass has become a dimensionally stable sheet at a viscosity of about $10^{6.0}$ poises, the more severe the development of top surface batter. For example, in a conventional float glass operation as described in U.S. Pat. No. 3,083,551 to Pilkington using conventional soda-lime-silica glass in which a 3/16 inch thick ribbon having a width of about 125 inches is produced in a forming chamber having an overall length of about 160 feet at a ribbon speed of about 280 inches per minute, top surface distortion is minimal. Distortion sums and distortion peak values for the top surface are about 1.1 diopter-inch and about 0.045 diopter, respectively; the smaller the value for diopter sum and diopter peak, the less the distortion. In continuously producing such a glass, the average rate of viscosity increase between the time the glass is delivered to the molten tin (viscosity $10^{3.5}$ poises) and the time the glass has attained its final shape and thickness (that is, viscosity $10^{6.0}$ poises) is about 333,000 poises per minute. On the other hand, where the glass is advanced through the forming chamber at a much higher speed, that is, at ribbon speeds of about 600 inches per minute to produce about 0.090 inch thick glass, top surface distortion becomes much worse. Distortion sum and distortion peak values are appreciably higher. The residence time of such a glass on the molten tin has decreased appreciably and the rate of viscosity increase between $10^{3.5}$ poises and $10^{6.0}$ poises is about 660,000 poises per minute. A similar phenomena has been observed with shorter forming chambers, that is, in shorter forming chambers where the rate of viscosity increase between $10^{3.5}$ and $10^{6.0}$ poises is about 600,000 poises per minute.

It is believed that the present invention is applicable in those situations in which molten glass from its point of delivery to the pool of molten tin until the glass reaches a viscosity of $10^{6.0}$ poises has an average increase in viscosity of 450,000 and especially greater than 600,000 poises per minute. Such average rates of viscosity increase without the practice of the present invention can lead to severe top surface distortion problems to make the glass commercially unacceptable in applications where quality control standards are high, such as automotive and aircraft glazing.

It should be appreciated that the rate of viscosity build up for the glass from point of delivery to the pool of molten tin to $10^{6.0}$ poises is not linear with travel time but is exponential with the rate of viscosity build up being greater initially when the glass is being rapidly cooled in the beginning of the bath from a relatively high temperature and becomes less and less as the glass is more slowly cooled further downstream in the bath. For the purposes of defining this invention, however, an average rate of viscosity increase is used which is simply the total increase in viscosity divided by the time in minutes for the increase to occur. As mentioned above, the viscosity of the glass at any point in the chamber can easily be determined by measuring its temperature and calculating the viscosity using Fulcher's Equation. The time in minutes for a viscosity build up is determined by measuring the ribbon speed as the glass is removed from the forming chamber.

In order to minimize as much as possible top surface distortion, the oxidizing agent should be added to the pool or bath of molten tin in the hotter regions of the forming chamber where the glass is very fluid. The oxidizing agent should be added to the bath of molten tin at a location wherein the glass supported thereon is at a viscosity of $10^{5.3}$ poises or less, preferably within the range of $10^{3.5}$ to $10^{4.8}$ poises. The amount of oxidizing agent added to the tin bath should, of course, be sufficient to maintain said glass substantially free of top surface distortion. Such an amount will usually be within the range of approximately at least 100 and preferably 500 to 5000 parts by weight oxidizing agent per million parts by weight of molten tin. The amount of oxidizing agent added to the molten tin will depend principally on the identity of the oxidizing agent, since some are more effective than others in minimizing top surface distortion.

As is shown in FIG. 3, an oxidizing agent such as cerium can be added to the pool of molten tin by a supply system which includes a pipe 14 connected to a source of molten tin (not shown) admixed with a sufficient amount of oxidizing agent. The pipe can be perforated so that the molten tin containing the oxidizing agent can be sparged continuously into the molten tin bath. Tin can be continuously removed from the forming chamber down towards the end of the chamber so that there is a constant level of tin maintained at all times. Introducing the oxidizing agent into the molten tin in that portion of the forming chamber where the glass is quite fluid and hot and is most readily able to absorb the oxidizing agent insures that most of the oxidizing agent will be taken up by the glass and not contaminate the entire tin bath. Also, the positioning of dams throughout the bath helps to insure that the oxidizing agent will be located at the hotter end of the forming chamber. To insure that the oxidizing agent remains in the hotter portions of the bath, purifiers, such as electrolytic cells which are described in U.S. Pat. No. 3,330,637 to Loukes et al can be used.

The oxidizing agent is one which is capable of oxidizing stannous ion to stannic ion in an environment of molten glass. By the term molten glass environment is meant molten glass of a composition commercially used in float glass production. These glasses are basically soda-lime-silica glasses and have approximately the following composition:

| Ingredient | Percent by Weight on an Oxide Basis |
|---|---|
| $SiO_2$ | 65 – 75 |
| $Na_2O$ | 10 – 15 |
| $K_2O$ | 0 – 2 |
| $Al_2O_3$ | 0 – 2 |
| CaO | 5 – 10 |
| MgO | 2 – 5 |
| $SO_3$ | 0 – 0.5 |
| $Fe_2O_3$ | 0 – 0.15 |

Such glasses are melted under conventional melting conditions as will be described in more detail later, and discharged in a molten condition to a pool of molten tin in a forming chamber which is maintained in a reducing atmosphere, for example, 95 percent nitrogen and 5 percent hydrogen. The glass upon initial discharge onto the pool of molten tin will usually be of a viscosity of about $10^{3.5}$ – $10^{4.0}$ poises depending somewhat on composition and how the glass is delivered to the molten tin, that is, by delivering the glass as the molten layer in a substantially horizontal manner as described in U.S. Patent Application Ser. No. 338,497, filed Mar. 6, 1973 to Edge et al, or delivering the glass to the molten tin and permitting it to freely spread over the surface of the molten tin such as described in U.S. Pat. No. 3,083,551 to Pilkington.

Suitable oxidizing agents for oxidizing stannous tin to stannic tin are the higher oxides of chromium, manganese, cerium, arsenic, antimony and iron. Examples of such higher oxides include $CrO_3$, $MnO_2$, $CeO_2$, $As_2O_5$, $Sb_2O_5$, $V_2O_5$ and $Fe_2O_3$. Although these oxides are shown in stoichiometric ratios, it should be appreciated that in molten glass the oxides may have non-stoichiometric formula. Also, the oxides are given in what is believed to be their highest oxidation state, although it is quite possible that higher oxidation states may exist in a molten glass environment. For example, $Mn_2O_7$ is thought to exist in molten glass. It is known from experimental and theoretical calculations that the above oxides are capable of oxidizing stannous tin to stannic tin in molten glass. See, for example, Kühl, C., Rudow, H. and Weyl, W., Oxydations-und Reduktionsgleichgewichte in Färbglasern, Sprechsaal, 71, 118 (1938); Tress, H. J., "A Thermodynamic Approach to Redox Equilibria in Glasses," Physics and Chemistry of Glasses, Vol. 1, No. 6, December 1960; and Johnston. W. D., "Oxydation-Reduction Equilibria in Molten $Na_2O \cdot 2SiO_2$ Glass", J. Am. Ceram. Soc., 48, April 1965, 184–190. Among the oxidizing agents mentioned above, cerium oxide is preferred because it imparts substantially no color to the glass, whereas other oxidizing agents such as antimony and chromium oxides impart color to the glass. However, even though coloring the glass, these oxidizing agents still perform the function of the invention, that is, enabling the float forming of flat glass substantially free of top surface distortion and also minimizing bloom formation during subsequent thermal treatment such as thermal tempering and bending.

Besides the above-mentioned oxides, other oxides should be suitable in the practice of the invention. An indication of the suitability of a particular oxide can be obtained from its Gibbs Free Energy ($\Delta G$) for the following reaction at standard conditions of temperature and pressure:

$$\text{lower oxide} + 1 \text{ mole } O_2 \rightarrow \text{higher oxide} \tag{1}$$

Gibbs Free Energy in molten glass cannot readily be determined because of the lack of information available for the above reaction in glasses. However, the Gibbs Free Energy at standard conditions of temperature and pressure ($\Delta G^o$) of various oxides can readily be obtained and is available from standard thermodynamic tables. See, for example, U.S. Bureau of Mines Bulletin No. 605, "Thermodynamic Properties of 65 Elements", C. E. Wicks and F. E. Block, U.S. Government Printing Office (1963). The Gibbs Free Energy of various redox oxides, although obviously being different in molten glass than at standard conditions of temperature and pressure, still should have the same order of value. Thus, if a first redox oxide has a more positive $\Delta G^o$ value for reaction (1) than a second redox oxide, then the first redox oxide should have a more positive $\Delta G$ in molten glass than the second redox oxide. This has been substantiated experimentally with the above-disclosed oxides. From the above-mentioned thermodynamic tables, $\Delta G^o$ for the conversion of stannous oxide to stannic oxide $$2SnO + O_2 \rightarrow 2SnO_2 \tag{2}$$

is $-125.4$ kilocalories/mole $O_2$. Therefore, for an oxidizing agent to oxidize stannous oxide to stannic oxide, the $\Delta G^o$ for the oxidizing agent in the reaction $$\text{lower oxide} + O_2 \rightarrow \text{higher oxide} \tag{1}$$

should have a substantially (that is, about 10 percent) more positive value than $-125.5$ kilocalories/mole of oxygen so that the combined reaction will have a negative $\Delta G^o$. For example $\Delta G^o$ for the reaction

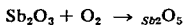

is $-52.5$ kilocalories/mole of oxygen. Thus, based on the Gibbs Free Energy, $Sb_2O_5$ should oxidize stannous oxide to stannic oxide in molten glass, that is,

| | $\Delta G^o$ (kilocalories/mole $O_2$) |
|---|---|
| $2SnO + O_2 \rightarrow 2SnO_2$ | $-125.5$ |
| $Sb_2O_5 \rightarrow Sb_2O_3 + O_2$ | $-52.5$ |
| $2SnO + Sb_2O_5 \rightarrow 2SnO_2 + Sb_2O_3$ | $-73.0$ |

The oxidizing agent can be added to the molten tin bath in the form of a higher oxide of the multivalent metals mentioned above, i.e., in a form which will oxidize stannous tin to stannic tin in the environment of molten glass.

As has been mentioned above, the amount of oxidizing agent added to the molten tin bath should be sufficient to maintain during the forming operation a glass substantially free of top surface distortion. By the term "substantially free of top surface distortion" is meant that the glass has less top surface distortion than the glass of comparable composition which has been melted and formed under identical conditions to those experienced by the glass containing the oxidizing agent, but without the addition of oxidizing agent to the molten tin bath.

Top surface distortion such as top surface batter is observed at a small angle (that is, about 10°) from the horizontal by reflected light. Top surface batter in float glass may be qualitatively evaluated by observing a shadow projection of the glass using a point-light source aimed perpendicularly at a target screen and positioning the glass at an angle with respect to the target screen so that an image of the glass is projected on the screen. The optical distortion may also be observed in Schlieren photographs of the glass. The optical distortion pattern is regular, repetitive and anisotropic in glass produced by the methods like that of Pilkington in U.S. Pat. No. 3,083,551 when the glass falls onto the molten metal and spreads outwardly and then is drawn inwardly again. With glass produced in the manner of Hitchcock in U.S. Pat. No. 789,911 or Edge et al in U.S. Patent application Ser. No. 338,497, filed Mar. 6, 1973, now U.S. Pat. No. 3,843,546 involving horizontal delivery onto the molten metal while maintaining the width of the glass substantially unchanged, the distortion pattern is regular, repetitive and substantially isotropic. In both types of glass, distortion may be sufficiently intense (that is, the variation of lightness to darkness and the projected shadow is great) to be easily observed by even an untrained eye when the glass is coated with a reflective coating and observed by reflected light.

Top surface batter in glass formed on a bath of molten tin is caused by variations in the surface of the glass. The surfaces are not perfectly flat but rather are characterized by a plurality of elevations and depressions which bend or distort a beam of light passing through the glass. Top surface batter can be detected during production using a device such as disclosed and claimed by Simko in U.S. Pat. No. 3,799,679 or in the manner described in U.S. Pat. No. 3,792,930 to Obenreder.

Optical distortion measurements, as described above, are made off-line on glass samples cut from the continuously formed float glass sheet. Normally the distortion measurements are made on a 22-inch scan length. Top surface distortion can be determined separately from bottom surface distortion and distortion in the bulk between the surfaces of the glass. Total distortion as determined by the above methods are reported as distortion sums and distortion peaks which are dimensionless values. However, a correlation between distortion sums and distortion peaks and diopter exists with each distortion sum unit being equivalent to 0.05 diopter-inch based on a standard 22-inch scan length. The distortion peak units are each equivalent to 0.002 diopter.

Flat glass samples prepared in accordance with the present invention over a thickness range of 0.090 to 0.5 inch have distortion sums within the range of 1.0 to 1.5 diopter-inch based on a standard 22-inch scan length and distortion peaks within the range of 0.02 to 0.05 diopter.

Another method of detecting top surface batter in float glass is by zebra board angle. The zebra board angle is the angle a specimen of glass may be placed with respect to a planar surface having thereon a series of straight lines and positioned perpendicular to the viewer's line of sight when the lines become distorted (bent) as viewed through the glass. The glass is midway between the planar surface and the viewer. If the glass were a perfect optical flat, it could be turned 90° without causing distortion. The test is simple and expedient, although less precise and more subjective than the distortion analysis mentioned earlier. Larger zebra board angles indicate less intense top surface batter. Flat glass formed in accordance with the invention have zebra board angles about 58° to 65° for glass having a thickness of 0.090 to 0.5 inch.

The glasses in which the practice of the invention is particularly useful are the soda-lime-silica glasses which are conventionally used in the manufacture of float glass. Batch materials which are used to make these glasses are those which are conventionally known in the flat glass art and include sand, soda ash, caustic soda, limestone, dolomite, aluminum hydrate, feldspar, aplite, nepheline syenite, rouge, salt cake, carbon and cullet (crushed glass). The soda-lime-silica glass batch-making materials and oxidizing agent when properly proportioned, mixed and melted, should give a glass having the following calculated composition:

| Ingredient | Percent by Weight on the Oxide Basis |
| --- | --- |
| $SiO_2$ | 65 – 75 |
| $Na_2O$ | 10 – 15 |
| $K_2O$ | 0 – 2 |
| $Al_2O_3$ | 0 – 2 |
| CaO | 5 – 10 |
| MgO | 2 – 5 |
| $SO_3$ | 0 – 0.5 |
| $Fe_2O_3$ | 0 – 0.15 |

Besides soda-lime-silica glasses, the invention should also be applicable to other glasses such as borosilicate glass, and alumino silicate glasses. Batch ingredients for preparing these glasses are well known in the art and information regarding suitable batch ingredients can be obtained from the Glass Engineering Handbook, E. B. Shand, 2nd Edition, McGraw-Hill Book Co., Inc., New York (1958).

Although not intending to be bound by any theory, the reason it is believed the incorporation of an oxidizing agent into the bottom or tin-contacting surface of the glass prevents or minimizes top surface batter of the glass is somewhat as follows:

During the time the glass increases in viscosity from after it has been initially delivered to the molten tin bath until it has become a dimensionally stable ribbon at about $10^{6.0}$ poises, the molten glass is being attenuated due to the tractive pulling forces in the end of the bath. It appears that if this increase in viscosity increases for a relatively short period of time or, in other words, the residence time of the tin on the bath is relatively short, then this rapid attenuation is most apt to produce top surface batter. It is also during this period of time that most of the tin in the form of stannous tin most readily penetrates into the bottom surface of the glass. It is believed that the oxidizing agent added to the hotter regions of the tin bath also penetrates into the bottom surface of the glass concurrently or before the stannous tin penetrates into the bottom surface. The oxidizing agent will quickly oxidize the penetrated stannous tin to stannic tin while the glass is still hot, relieving by viscoelastic flow any stresses imposed on the glass. If, on the other hand, the glass does not contain a sufficient amount of a capable oxidizing agent in the bottom surface of the glass, the stannous tin will not readily be oxidized, but will be more slowly oxidized as the glass passes into the cooler regions of the forming chamber due to the dissolved oxides and dissolved oxygen in the glass itself. In these cooler regions of the bath, the glass has further increased in viscosity to a point where it has become quite rigid and is less able to relieve stresses imposed upon the surface of the glass by viscoelastic flow. As a result, the surfaces of the glass including the top surface distort to remove the stress that is developing on the bottom surface due to the volume change associated with the conversion of stannous tin to stannic tin. Surprisingly, the top surface of the glass also distorts in response to the stresses originating in the bottom surface.

This phenomena of bottom surface distortion due to stannous tin pick up transferring through to the top surface of the glass was substantiated by taking two samples of float glass which have been prepared from the same ribbon of glass and heating and attenuating the samples at about the softening point of the glass. Attenuation at this temperature is believed to represent the attenuation a glass experiences while being formed on molten tin. Both samples of glass were heated and attenuated in an air atmosphere but one of the glass samples had its bottom or tin-contacting surface etched away with hydrofluoric acid so that the etched surface showed no tin penetration by ultraviolet light fluorescence. The other sample of glass showed by electron microprobe analysis tin contents of approximately 1 percent by weight penetrated about 20 microns into the surface of the glass, the percentage by weight being the average in the first 20 microns of surface depth with the tin concentration being greater nearer the surface. The results of the testing were that the unetched sample attenuated in air, developed a heavy bloom on the bottom surface and a bad top surface batter. The sample in which the tin-contacting surface had been chemically etched away developed no bloom or batter when heated and attenuated in air.

The significance of the experiments are that the bottom surface chemistry is not only the cause of bloom on the bottom surface but also surprisingly can be the cause of distortion on the top surface.

It is believed that adding an oxidizing agent to the hotter regions of the tin bath results in the oxidizing agent being absorbed from the tin into the bottom surface of the glass sheet being formed. Upon being absorbed, the oxidizing agent chemically modifies the bottom surface of the glass by quickly oxidizing any penetrated stannous tin while the glass is still fluid and can relieve any stresses due to the volume change associated with the conversion of stannous to stannic. This modification affects the top surface making it substantially free of distortion.

We claim:

1. In a method for forming flat glass wherein molten glass is continuously delivered into a forming chamber and deposited onto a pool of molten tin upon which the molten glass is supported and advanced as the molten glass is cooled and subjected to attenuating forces to cause a dimensionally stable, continuous sheet of glass to be formed therefrom, the method being further characterized by a rapid rate of cooling of the glass as it is advanced along the molten tin such that the viscosity of the glass increases at an average rate of at least 450,000 poises per minute from its delivery into the forming chamber until it reaches a viscosity of approximately $10^{6.0}$ poises, the improvement comprising:

adding to the pool of molten tin, by means separate from the glass itself, an oxidizing agent capable of oxidizing stannous tin to stannic tin in the environment of molten glass, said oxidizing agent being added in the form of a higher oxide of a multivalent metal, and said oxidizing agent being maintained in a sufficient concentration in a region of the molten tin contacting glass whose viscosity is no more than $10^{5.3}$ poises to substantially avoid the formation of top surface distortion in the glass.

2. The method of claim 1 in which the average rate of viscosity increase for the glass from its point of delivery to a viscosity of approximately $10^{6.0}$ poises is greater than 600,000 poises per minute.

3. The method of claim 1 in which the oxidizing agent is introduced into the molten tin at a location wherein the glass supported thereon has attained a viscosity within the range of $10^{3.5}$ to $10^{4.8}$ poises.

4. The process of claim 1 in which the oxidizing agent is mixed with the molten tin at a location apart from where said glass is supported on said molten tin and the mixture of molten tin and oxidizing agent is added to the pool of molten tin by sparging at a location where the glass has a viscosity within the range of $10^{3.5}$ to $10^{5.3}$ poises.

5. The method of claim 1 in which the glass being formed is a soda-lime-silica glass.

6. The method of claim 1 in which the molten glass is delivered to the pool of molten tin and is freely spread over the surface of the tin to form a fluid pool of glass followed by attenuating said fluid pool of glass to form a continuous sheet of flat glass.

7. The process of claim 1 in which the molten glass is delivered to the pool of molten tin as a layer of molten glass.

8. The method of claim 7 in which the layer of molten glass is delivered to the pool of molten tin in a substantially horizontal manner from a region of molten glass which is at substantially the same elevation as that of the molten tin.

9. The method of claim 1 in which the glass is delivered at a temperature greater than its liquidus temperature to the molten tin.

10. The method of claim 1 in which the glass is delivered at a viscosity of less than $10^{4.0}$ poises to the molten tin.

11. The method of claim 1 in which said multivalent metal is selected from the group consisting of chromium, manganese, cerium, arsenic, antimony, vanadium, and iron.

* * * * *